3,537,822
METHOD FOR THE DETERMINATION OF SERUM IRON AND TOTAL IRON BINDING CAPACITY

John A. O'Malley, Merchantville, N.J., Anne E. Hassan and Judith R. Shiley, Philadelphia, Pa., and Henry G. Traynor, Glenhead, N.Y., assignors to American Hospital Supply Corporation, Evanston, Ill., a corporation of Illinois
No Drawing. Filed Mar. 28, 1969, Ser. No. 811,590
Int. Cl. G01n 21/06, 21/20
U.S. Cl. 23—230                8 Claims

ABSTRACT OF THE DISCLOSURE

A relatively fast, simple, and accurate method for determining both serum iron concentration and total iron binding capacity of a single serum sample in a single test tube, utilizing one color-developing agent, 2,4,6-tripyridyl-s-triazine (TPTZ) for both tests. Ascorbic acid is used as the agent for reducing the iron to its ferrous state and, after the serum iron determination is made, a Tris buffer is used to combine the iron in its reduced state with the protein as the initial step of the iron binding capacity test.

BACKGROUND

As is well known, the determination of serum iron content is a measurement of iron already bound to protein, while the determination of total iron binding capacity (TIBC) is a measurement of the iron that can be bound by the same protein. These determinations are growing increasingly popular in the clinical laboratory because of their usefulness in establishing diagnoses of several diseases and differentiating among several others. Thus, measurement of serum iron concentration is helpful in diagnosing iron deficiency, siderosis, and hemochromatosis, while assay of the iron binding capacity permits differentiation of the hypoferemia of iron deficiency from that of inflammatory or neoplastic diseases.

In 1966, Williams and Conrad disclosed a single-tube method for measuring both serum iron concentration and unsaturated iron binding capacity (67 J. Lab. & Clin. Med. 171–176, No. 1 (January 1966)). In the Williams-Conrad method, which employs two buffers, a reducing agent, an iron solution, and two color-developing agents, the tests are run stepwise in the single test tube, first the serum iron tests, and secondly the TIBC test. For the determination of serum iron, HCl-KCl is used as an acid buffer, hydroxylammonium hydrochloride as a reducing agent, and tripyridyl triazine (TPTZ) as the color-developing agent. For the TIBC portion of the test, an alkaline Tris buffer (2 - amino - 2-[hydroxymethyl]-1,3-propanediol) is added to dissociate the iron from TPTZ to allow the iron to recombine with the protein. Then a known amount of excess iron is added, allowed to bind with the protein, and the iron which does not so combine with the protein is measured after the addition of a second color-developing agent, tripyridyl. Simple subtraction yields the unsaturated iron binding capacity value, and addition of the serum iron value to that yields the TIBC value.

SUMMARY

A principal object of the present invention is to improve the procedure described above so that the number of reagents and manipulative steps are reduced, thereby providing a fast and simplified method for determining both serum iron concentration and iron binding capacity while at the same time achieving levels of precision and accuracy as high or higher than prior testing procedures. One aspect of the invention lies in the discovery that where ascorbic acid is used as the reducing agent during the serum iron portion of the test procedure, the same color-developing agent (TPTZ) may be used not only at acid pH levels during the serum iron determination but also at the alkaline pH levels obtained by the addition of a Tris buffer during the TIBC portion of the test. Thus, the color-developing agent need be added only once to the test tube or cuvette at an early stage in the test procedure. Furthermore, readings in a spectrophotometer may be made at the same wavelength, thereby further simplifying and facilitating the testing procedure.

In the method of the present invention, an acid buffer containing ascorbic acid is first mixed with a measured quantity of serum, thereby releasing the iron from the protein of the serum and reducing it to the ferrous state. The color reagent is then added and it reacts with the ferrous ion to give a bluish color to the acidic medium, the concentration of the serum iron being directly proportional to the intensity of the developed color. To determine the total iron binding capacity, the TPTZ-iron complex is dissociated by adding an alkaline buffer (Tris) to the solution, thereby rebinding the iron to the protein. Then a known amount of iron is added to saturate the remaining iron sites of the protein and, after the protein is saturated, the excess iron reacts with the color developing reagent (TPTZ). The concentration of the excess iron is directly proportional to the intensity of the developed color. The amount of excess iron subtracted from the known amount added yields the unsaturated iron binding capacity (UIBC), and the sum of the UIBC and the serum iron values equals the total iron binding capacity (TIBC).

Other objects and advantages of the invention will be apparent from the following detailed description.

DESCRIPTION

Since the method of this invention gives a quantitative colorimetric indication of free iron concentration (either as a result of dissociation of serum iron during the initial portion of the test or the presence of excess iron during the latter portion), the tests may be carried out directly in a cuvette. Furthermore, only a single cuvette is necessary for the actual tests, although accepted laboratory procedure requires the use of two additional cuvettes, one for a serum blank and the other for a reagent blank, to correct for any contamination of the reagents or turbidity of the serum.

As the first step in the procedure, a measured amount of unhemolyzed serum is placed in a cuvette or other suitable container. An acid buffer containing ascorbic acid is then mixed with the serum sample to obtain a solution having a pH within the general range of 2 to 6 and, preferably, within the range of 3 to 5. A pH of 4 is believed to be an optimum pH level.

Serum iron is dissociated from the protein or transferring of the serum in the acid medium and the ascorbic acid reduces such iron from its ferric to its ferrous state, thereby permitting interaction between the reduced iron and the color-forming agent during the next procedural step. Any suitable acid buffer may be used, a standard HCl-KCl buffer having been found effective. The amount of ascorbic acid in the acid buffer is regarded as non-critical with amounts in the range of 0.05 gram to 0.6 gram for each 10 milliliters (ml.) buffer solution producing effective results. It is believed apparent that the ascorbic acid need be present in an amount sufficient only to insure complete reduction of the iron dissociated from the protein of the serum in the acid medium.

The color reagent is prepared by dissolving 2,4,6-tripyridyl-s-triazine (TPTZ) in a few drops of dilute hydrochloric acid and then diluting with enough iron-free water to make a 0.3% TPTZ solution (i.e., 0.3 gram TPTZ per 100 milliliters solution). A measured amount of the TPTZ color-forming agent is then mixed with the sample solution to obtain a final TPTZ concentration within the range of about 0.005 M to 0.01 M and, after full color development (4 to 6 minutes) the optical density of the test solution is read on a spectrophotometer at a wavelength of 595 millimicrons (m$\mu$). Iron levels in microgram percent are then taken directly from a standard iron calibration curve.

The procedure for determining total iron binding capacity is carried out in the same cuvette or tube directly after the serum iron concentration determination has been made. The test solution is mixed with an alkaline iron-binding buffer comprising an aqueous solution of hydroxymethylaminomethane or "Tris" to re-bind the dissociated iron with the protein or transferrin of the serum. The buffer is added in sufficient volume and concentration to increase the pH of the serum solution to a level within the range of approximately 7 to 9. An effective alkaline buffer may be obtained by preparing a 2 to 3 molar aqueous solution of Tris buffer and then adjusting the same to a pH of approximately 9 with hydrochloric acid.

To the alkaline test solution containing re-bound iron is then added a known excess of iron, more than enough to occupy all of the remaining sites on the transferrin. Any commercially available iron solution may be used which is then preferably diluted to a concentration of 10 micrograms of elemental iron per milliliter of solution. Since the color-forming agent (TPTZ) is already present in the test solution, the excess iron will react or complex with the color-developing agent to produce a color intensity which is proportional to the excess (i.e., unbound) iron concentration.

To promote the development of color in the TIBC portion of the test, the reactants may be placed in a water bath at approximately 37 degrees C. for 20 to 60 minutes. Agitation of the test solution upon removal from the water bath is to be avoided; if vigorous shaking of the cuvette inadvertently occurs, then additional incubation will be necessary until the color reappears and stabilizes. The disappearance of color upon agitation is believed to occur because oxygen from the atmosphere interacts with the ferrous iron and oxidizes it to the ferric state, a state which does not react with TPTZ to develop color.

Following color development in the TIBC portion of the test, the serum solution in the cuvette is placed in a spectrophotometer and the optical density is measured at a wavelength of 595 m$\mu$. The amount of excess iron is then determined by reference to a standard calibration curve and the subtraction of that amount from the known amount of added iron yields the unsaturated binding capacity (UIBC) of the serum sample. The total iron binding capacity (TIBC) equals the sum of the UIBC and the serum iron value previously determined.

From the foregoing, it is believed apparent that the method of the present invention involves the use of a single color-developing agent for the determination of both serum iron concentration and total iron binding capacity. Furthermore, since the same color-forming agent is involved, both portions of the test are conducted in the same cuvette and optical readings are taken at the same wavelength for each portion of the test.

To achieve color development in both portions with a single color-developing agent (TPTZ), it has been found essential that ascorbic acid be used as the reducing agent. As indicated by examples set forth hereinafter, other reducing agents such as hydroxylammonium hydrochloride are completely ineffective in producing a color reaction during the second or TIBC portion of the test. While the reason for the effectiveness of ascorbic acid as a reducing agent, and the inoperability of other known reducing agents, may not be completely understood, it is believed that such other reducing agents tend to react with the buffer or with other components at alkaline pH and that because of such reaction they are rendered ineffective as reductants.

The method and advantages of the present invention are further illustrated by the following examples:

EXAMPLE 1

Reagents suitable for use in practicing the method of the invention were prepared as follows:

In final solution (1) Iron buffer pH 2.2:
  Potassium chloride, ACS reagent grade___ 0.186 N
(2) Ascorbic acid, USP.
(3) TPTZ color reagent:
  Tripyridyl-s-triazine, iron free_____ 0.0096 M
  Hydrochloric acid, ACS reagent grade___ 0.033 N
  Iron free water, less than 2 $\mu$g. percent Fe.
(4) Iron binding buffer, pH 9.0:
  Tris (hydroxymethylaminomethane)____ 3.0 M
  Hydrochloric acid, ACS reagent grade___ 0.36
  Iron free water, less than 2 $\mu$g. percent Fe.
(5) Iron standard, 1 ml.=10 $\mu$g. Fe:
  Ferric ammonium sulfate·12H$_2$O ACS reagent grade_____ 0.000179 M
  Sulfuric acid, ACS reagent grade_____ 0.005 N
  Iron free water, less than 2 $\mu$g. percent Fe.

EXAMPLE 2

Using the reagent set forth in Example 1, serum iron concentration and TIBC of a sample may be determined by the following procedure:

First pipet 1.0 ml. of unhemolyzed serum into two separate cuvettes; label them serum test and serum blank. Into another cuvette pipet 1.0 ml. iron free water, label reagent blank. Add 0.3 g. ascorbic acid to 10 ml. of iron buffer prior to use, mixing well to assure a uniform solution.

Pipet 2.5 ml. of the iron buffer reducing agent to the three cuvettes. Mix and let stand approximately 4 minutes to insure completeness of reaction. Then pipet 0.25 ml. of TPTZ color reagent into the cuvettes labeled serum test and reagent blank. Pipet 0.25 ml. of iron free water to the serum blank. Again, to insure completeness of reaction, the solutions in each cuvette should be mixed and left standing for a short interval (4–5 minutes).

To determine serum iron concentration, the optical density is measured on a spectrophotometer at 595 m$\mu$. Set the instrument at 100% transmittance with the reagent blank and proceed to read the serum test. Then set the instrument at 100% transmittance with distilled water and proceed to read the serum blank. Subtract the optical density of the serum blank from that of the serum test. This step cancels out iron contamination or reagents and turbidity of serum. Iron level in microgram percent ($\mu$g. percent) is then obtained directly from the standard iron calibration curve.

Proceeding with the TIBC portion of the test, pipet 2.0 ml. of the iron binding buffer to each of the cuvettes containing the reagent blank, serum test, and serum blank used in the serum iron procedure. Then pipet 0.5 ml. of iron free water to the reagent blank and serum blank and pipet 0.5 ml. of iron standard to the serum test. Mix by inverting the cuvettes against a polyethylene film and then place the cuvettes in a 37 degree C. water bath for 60 minutes. Do not shake or mix the cuvettes on removal from the water bath.

Optical density is again measured on the spectrophotometer set at a wavelength of 595 m$\mu$. All readings taken as described above in connection with the serum iron portion of the test, to determine the amount of excess unbound iron. That amount, subtracted from the known amount of added iron, yields the unsaturated iron binding capacity (UIBC), and the TIBC equals the sum of the UIBC and the previously-determined serum iron value.

In carrying out this procedure, all glassware, including the pipets and cuvettes, should first be freed of iron contamination by soaking in 6 M hydrochloric acid for one-half hour before use, and then rinsed well with iron free water. For the experimental work, most optical readings were taken from a Spectronic 20 using one-half inch cuvettes; however, any instrument of similar quality may be used.

EXAMPLE 3

The following tables reveal that the concentration of ascorbic acid in the test procedure of the invention is not critical:

TABLE I.—EFFECT OF VARIATIONS OF ASCORBIC ACID (IN μG. PERCENT)

[Serum iron portion of test]

| Grams ascorbic acid per 10 ml. KCl-HCl buffer | 0.1 | 0.2 | 0.3 | 0.5 |
|---|---|---|---|---|
| Known Sample 1 (stated Fe value 108±8) | 93 | 105 | 111 | 105 |
|  |  | 110 | 100 | 110 |
|  |  |  | 95 | 92 |
|  |  |  | 110 |  |
|  |  |  | 108 |  |
| Known Sample 2 (stated Fe value 95±10) | 88 | 90 | 100 | 100 |
|  |  | 95 | 95 | 100 |
|  |  |  | 88 | 85 |
|  |  |  | 102 |  |
|  |  |  | 97 |  |

TABLE II.—EFFECT OF VARIATIONS OF ASCORBIC ACID (IN μG. PERCENT)

[TIBC portion of test]

| Grams ascorbic acid per 10 ml. KCl-HCl buffer | 0.1 | 0.2 | 0.3 | 0.4 |
|---|---|---|---|---|
| Known Sample 1 (stated TIBC value 355±15) | 454 | 407 | 353 | 335 |
|  |  | 397 | 365 | 345 |
|  |  |  | 359 |  |
|  |  |  | 387 |  |
|  |  |  | 390 |  |
| Known Sample 2 (stated TIBC value 320±25) | 425 | 340 | 342 | 280 |
|  |  | 340 | 314 | 258 |
|  |  |  | 298 | 264 |
|  |  |  | 337 |  |
|  |  |  | 305 |  |

EXAMPLE 4

To determine the effect of pH on formation of the iron-TPTZ complex, solutions containing 4 μg. of iron, 0.25 ml. of 0.3 g. percent TPTZ, and 2.5 ml. of various buffers, each containing 0.3 g. ascorbic acid per 10 ml. of buffer, were diluted to final volumes of 3.75 ml. The buffers were KCl-HCl, KCl-NH$_4$OH, and Tris solutions. The pH of each solution was read on a pH meter and its absorbency determined at 595 mμ using a Spectronic 20 spectrophotometer. The results showed uniform optical densities within the range of 0.45 to 0.49 over a pH range of 2 to 10 and reveal that color is completely formed over that pH range.

EXAMPLE 5

The effectiveness of the present method for determining serum iron values and TIBC values is indicated by a comparison of the results of such method (carried out as set forth in Examples 1 and 2) with the results of a well-established conventional method performed on the serum of the same test subjects. Forty test subjects, 18 female and 22 male, were chosen at random from presumably healthy subjects. The established method used as a basis of comparison was the method developed by Peters and his co-workers and published in J. Lab. & Clin. Med., vol. 48, pp. 274, 280 (1956). The comparisons for serum iron and TBIC tests are set forth in the following tables:

TABLE III.—SERUM IRON

| Sex | Present method | Peters' method | Diff. |
|---|---|---|---|
| M | 114 | 119 | +5 |
| M | 139 | 135 | −4 |
| M | 170 | 170 | 0 |
| M | 125 | 120 | −5 |
| F | 83 | 80 | −3 |
| F | 134 | 135 | +1 |
| F | 118 | 110 | −8 |
| F | 111 | 110 | −1 |
| M | 130 | 128 | −2 |
| M | 75 | 77 | +2 |
| M | 84 | 80 | −4 |
| M | 124 | 123 | −1 |
| F | 36 | 37 | +1 |
| F | 75 | 78 | +3 |
| F | 84 | 82 | −2 |
| M | 139 | 139 | 0 |
| M | 115 | 115 | 0 |
| F | 97 | 100 | +3 |
| M | 82 | 86 | +4 |
| F | 157 | 148 | −9 |
| F | 58 | 55 | −3 |
| F | 63 | 60 | −3 |
| F | 72 | 80 | +8 |
| F | 114 | 117 | +3 |
| F | 32 | 55 | +23 |
| M | 98 | 99 | +1 |
| M | 96 | 99 | +3 |
| F | 81 | 73 | −8 |
| F | 88 | 84 | −4 |
| F | 37 | 31 | −6 |
| M | 78 | 75 | −3 |
| M | 89 | 80 | −9 |
| M | 145 | 150 | +5 |
| F | 224 | 218 | −6 |
| M | 107 | 101 | −6 |
| M | 82 | 85 | +3 |
| M | 94 | 100 | +6 |
| F | 78 | 87 | +9 |
| M | 177 | 176 | −1 |
| M | 157 | 157 | 0 |

TABLE IV.—TIBC

| Sex | Present method | Peters' method | Diff. |
|---|---|---|---|
| M | 378 | 374 | −4 |
| M | 404 | 403 | −1 |
| M | 348 | 341 | −7 |
| M | 393 | 403 | +10 |
| F | 380 | 389 | +9 |
| F | 337 | 298 | −39 |
| F | 323 | 307 | −16 |
| F | 329 | 298 | −31 |
| M | 309 | 329 | +20 |
| M | 274 | 307 | +33 |
| M | 313 | 307 | −6 |
| M | 336 | 353 | +17 |
| F | 387 | 374 | −13 |
| M | 303 | 295 | −8 |
| F | 289 | 281 | −8 |
| M | 355 | 334 | −21 |
| M | 383 | 379 | −4 |
| F | 332 | 307 | −25 |
| M | 387 | 374 | −13 |
| F | 390 | 374 | −16 |
| F | 313 | 298 | −15 |
| F | 377 | 362 | −15 |
| F | 420 | 437 | +17 |
| F | 293 | 286 | −7 |
| F | 289 | 281 | −8 |
| M | 343 | 322 | −21 |
| M | 346 | 348 | +2 |
| F | 379 | 379 | 0 |
| F | 305 | 288 | −17 |
| F | 393 | 382 | −11 |
| M | 352 | 346 | −6 |
| M | 317 | 336 | +19 |
| M | 349 | 360 | +11 |
| F | 341 | 354 | +13 |
| M | 323 | 346 | +23 |
| M | 425 | 456 | +31 |
| M | 324 | 358 | +34 |
| F | 303 | 341 | +38 |
| M | 369 | 386 | +17 |
| M | 339 | 353 | +14 |

Although the serum iron values range from 32 to 224, there is no bias between the two methods and the standard deviation between them is less than 6 μg. percent. With respect to the TIBC comparison, the values run from a low of 274 to a high of 425. There is no bias between the methods and the standard deviation between them is less than 19 μg. percent.

EXAMPLE 6

The color development of TPTZ with ferrous ion at pH 2.2 and pH 9.0 in the presence of the following five reducing agents was analyzed: hydroxylammonium chloride, hydrazine sulfate, thioglycolic acid, sodium sulfate, thioglycolic acid, sodium sulfite and ascorbic acid.

At pH 2.2 in the presence of thioglycolic acid (80 percent solution; 1 drop/test), or hydroxylammonium chloride (0.125 g. percent; 2 ml./test), or ascorbic acid (0.3 g./10 ml.; 2.5 ml./test), aqueous solutions of ferrous ions (0.000035 molar) and TPTZ developed approximately equivalent amounts of color. Much less color was developed when hydrazine sulfate (saturated solution; 0.3 ml./test) or sodium sulfite (0.1 M; 1 ml./test) were used as the reducing agent.

At pH 9.0 with thioglycolic acid, a slight pink color developed. No appreciable blue color developed at pH 9.0 with any of the reducing agents except ascorbic acid. In the case of ascorbic acid, the produced color had approximately 95 percent of the optical density of that at pH 2.2. The alkaline pH for all such tests was maintained with a Tris buffer prepared as set forth in Example 1.

While in the foregoing we have disclosed an embodiment of the invention in considerable detail for purposes of illustration, it will be understood by those skilled in the art that many of these details may be varied without departing from the spirit and scope of the invention.

We claim:

1. A method for determining both the serum iron concentration and the total iron binding capacity of a serum sample using a single color-developing agent, comprising the steps of mixing said sample with ascorbic acid at a pH within the range of about 2 to 6 to dissociate iron from the protein of said sample and to reduce said iron to the ferrous state, then adding a color reagent comprising an aqueous solution of 2,4,6-tripyridyl-s-triazine to produce a color proportional in intensity to the concentration of the reduced iron, then re-binding said iron with the protein of said sample by increasing the pH to about 7 to 9 while adding a known amount of excess iron to saturate the remaining iron sites on the protein of said sample, said color reagent reacting with the excess iron in the presence of said ascorbic acid to produce a color proportional in intensity to the concentration of unbound excess iron.

2. The method of claim 1 in which said sample is mixed with ascorbic acid at a pH within the range of about 3 to 5.

3. The method of claim 1 in which the pH of said sample is increased by mixing with said sample an aqueous solution of 2-amino-2-[hydroxymethyl]-1,3-propanediol.

4. A method for determining both the serum iron concentration and the total iron binding capacity of a serum sample wherein said sample is first mixed with an acid buffer to dissociate iron from serum protein and with a reducing agent to reduce such dissociated iron to a ferrous state, then reacted with a color reagent for colorimetrically and quantitatively determining the concentration of serum iron, and then mixed with an alkaline buffer comprising hydroxymethylaminomethane as an initial step in a subsequent determination of iron binding capacity, wherein the improvement comprises:

performing said first-mentioned mixing step with ascorbic acid as said reducing agent, thereby permitting the use of said color reagent as the sole color reagent for both serum iron and subsequent iron binding capacity determinations.

5. The method of claim 4 in which said first-mentioned mixing step comprises mixing said sample with an aqueous solution of said acid buffer and ascorbic acid, said ascorbic acid having a concentration of .05 to 0.6 gram for each 10 milliliters of acid buffer solution.

6. The method of claim 4 in which said color reagent is an aqueous solution of tripyridyl-s-triazine.

7. A method for determining both the serum iron concentration and the total iron binding capacity of a serum sample in which said sample is first mixed with an acid buffer and a reducing agent in solution therewith to dissociate iron from said serum and reduce the same to a ferrous state, then reacted with tripyridyl-s-triazine for colorimetrically and quantitatively determining the concentration of serum iron, then mixed with an alkaline buffer comprising hydroxymethylaminomethane to increase the pH of the solution to an alkaline level to re-bind said dissociated iron with said protein, and then mixed with a standard iron solution containing a known excess of ferrous iron so that the added iron may occupy additional sites on the protein of said serum while leaving a portion of said added iron in solution for quantitative and colorimetric determination, wherein the improvement comprises:

performing said first-mentioned mixing step with ascorbic acid as said reducing agent in solution with said acid buffer, and thereafter reacting the unbound portion of said added iron with said tripyridyl-s-triazine added during the second-mentioned step for colorimetrically and quantitatively determining the amount of unbound excess iron in solution at an alkaline pH level.

8. The method of claim 7 in which said ascorbic acid has a concentration of between 0.05 to 0.6 gram for each 10 milliters of acid buffer solution.

References Cited

L. Erdey et al.: Anal. Chem., 24, 418–422 (1952).

JOSEPH SCOVRONEK, Primary Examiner

S. MARANTZ, Assistant Examiner